US007209747B2

(12) United States Patent
Chen

(10) Patent No.: US 7,209,747 B2
(45) Date of Patent: Apr. 24, 2007

(54) HANDLING OF AN UNRECOVERABLE ERROR ON A DEDICATED CHANNEL

(75) Inventor: Rex Huan-Yueh Chen, Chi-Lung (TW)

(73) Assignee: Asustek Computer Inc., Taipei (TW)

( * ) Notice: Subject to any disclaimer, the term of this patent is extended or adjusted under 35 U.S.C. 154(b) by 615 days.

(21) Appl. No.: 10/605,121

(22) Filed: Sep. 10, 2003

(65) Prior Publication Data

US 2005/0054298 A1 Mar. 10, 2005

(51) Int. Cl.
*H04Q 7/20* (2006.01)

(52) U.S. Cl. .................................... 455/450; 455/67.11

(58) Field of Classification Search ............ 455/67.11, 455/450; 370/335, 342
See application file for complete search history.

(56) References Cited

U.S. PATENT DOCUMENTS

2001/0018342 A1* 8/2001 Vialen et al. ............... 455/423

* cited by examiner

*Primary Examiner*—Lee Nguyen
(74) *Attorney, Agent, or Firm*—Birch, Stewart, Kolasch & Birch LLP

(57) ABSTRACT

User equipment (UE) can detect a Radio Link Control (RLC) unrecoverable error and a Radio Link (RL) failure. The two errors are handled differently while the UE is in a dedicated channel (DCH) state. The RL failure leads to execution of Radio Access Bearer (RAB) release steps, characterized by utilizing respective timer values to determine if associated RABs should be released. The RLC unrecoverable error is not permitted to execute the RAB release steps. This prevents unnecessary dropping of services. The UTRAN can optionally include and set the indicators to command the UE to perform the indicated RLC re-establishmentprocedure.

6 Claims, 6 Drawing Sheets

HANDLING OF AN UNRECOVERABLE ERROR ON A DEDICATED CHANNEL

CROSS REFERENCE To RELATED APPLICATIONS

This application claims the benefit of U.S. Provisional Application No. 60/319,465, filed Aug. 13, 2002, and included herein by reference.

BACKGROUND OF INVENTION

1. Field of the Invention

The present invention relates to a wireless communications device. More particularly, the present invention relates to discriminating between the handling of a layer 2 unrecoverable error and a layer 1 radio link failure.

2. Description of the Prior Art

The 3$^{rd}$ Generation Partnership Project (3GPP) specifications 3GPP TS 25.331 V3.11.0 (2002–06) "Radio Resource Control (RRC) Protocol Specification" and 3GPP TS 25.322 V3.11.0 (2002–06) "Radio Link Control (RLC) protocol specification", both of which are included herein by reference, provide technical description of a Universal Mobile Telecommunications System (UMTS). The UMTS discloses a device (typically a mobile device), termed user equipment (UE), in wireless communications with one or more base stations. These base stations (so-called Node Bs) with Radio Network Controllers (RNCs) are collectively termed the UMTS Terrestrial Radio Access Network, or UTRAN for short.

Please refer to FIG. 1. FIG. 1 is a simple block diagram of a 3GPP wireless communications network 10. The wireless communications network 10 comprises a plurality of radio network subsystems (RNSs) 20 in communications with a core network (CN) 30. The CN 30 includes a packet switch (PS) domain 30*p* and a circuit switch (CS) domain 30*c*. The plurality of RNSs 20 form a UTRAN 20*u*. Each RNS 20 comprises one RNC 22 that is in communications with a plurality of Node Bs 24. Each Node B 24 is a transceiver, which is adapted to send and receive wireless signals, and which defines a cell region. A number of cells (i.e., a number of Node Bs 24) taken together defines a UTRAN Registration Area (URA). In particular, the wireless communications network 10 assigns a UE 40 to a particular RNS 20, which is then termed the serving RNS (SRNS) 20*s* of the UE 40. Data destined for the UE 40 is sent by the CN 30 (or UTRAN 20*u*) to the SRNS 20*s*. It is convenient to think of this data as being sent in the form of one or more packets that have a specific data structure, and which travel along one of a plurality of radio bearers (RBs) 28, 48. An RB 48 established on the UE 40 will have a corresponding RB 28 established on the UE SRNS 20*s*. The RBs are numbered consecutively, from RB0 to RBn. Typically, RB0 to RB4 are dedicated signaling RBs (SRBs), which are used for passing protocol signals between the UTRAN 20*u* and the UE 40, and will be described in some more detail below. RBs 28, 48 greater than four (i.e., RB5, RB6, etc.) are typically used to carry user data. The RNC 22 utilizes a Node B 24, which may be assigned to the UE 40 by way of a Cell Update procedure, to transmit data to, and receive data from, the UE 40. The Cell Update procedure is initiated by the UE 40 to change a cell as defined by a Node B 24. Selection of a new cell region will depend, for example, upon the location of the UE 40 within the domain of the SRNS 20*s*. The UE 40 sends data to the wireless communications network 10, which is then picked up by the SRNS 20*s* and forwarded to the CN 30. Occasionally, the UE 40 may move close to the domain of another RNS 20, which is termed a drift RNS (DRNS) 20*d*. A Node B 24 of the DRNS 20*d* may pick up the signal transmitted by the UE 40. The RNC 22 of the DRNS 20*d* forwards the received signal to the SRNS 20*s*. The SRNS 20*s* uses this forwarded signal from the DRNS 20*d*, plus the corresponding signals from its own Node Bs 24 to generate a combined signal that is then decoded and finally processed into packet data. The SRNS 20*s* then forwards the received data to the CN 30. Consequently, all communications between the UE 40 and the CN 30 must pass through the SRNS 20*s*.

Please refer to FIG. 2 in conjunction with FIG. 1. FIG. 2 is a simple block diagram of a UMTS radio interface protocol architecture, as used by the communications network 10. Communications between the UE 40 and the UTRAN 20*u* is effected through a multi-layered communications protocol that includes a layer 1, a layer 2 and a layer 3, which together provide transport for a signaling plane (C-plane) 92 and a user plane (U-plane) 94. Layer 1 is the physical layer 60, and in the UTRAN 20*u* is responsible for combining signals received from the DRNS 20*d* and SRNS 20*s*. Layer 2 includes a packet data convergence protocol (PDCP) layer 70, a Radio Link Control (RLC) layer 72, and a Medium Access Control (MAC) layer 74. Layer 3 includes a Radio Resource Control (RRC) layer 80. The U-plane 94 handles user data transport between the UE 40 and the UTRAN 20*u* (RBs 28, 48 from five and upwards), whereas the C-plane 92 handles transport for signaling data between the UE 40 and the UTRAN 20*u* (RBs 28, 48 from zero to four). The RRC 80 sets up and configures all RBs 28, 48 between the UTRAN 20*u* and the UE 40. The PDCP layer 22 provides header compression for Service Data Units (SDUs) received from the U-plane 94. The RLC layer 72 provides segmentation of PDCP 70 SDUs and RRC 80 SDUs into RLC protocol data units (PDUs). The RLC layer 72 is composed of one or more RLC entities 76. Each RLC entity 76 is individually associated with an RB 28, 48. For an RB 28 on the UTRAN 20*u* side, there exists an RLC entity 76 dedicated solely to that RB 28. For the same RB 48 on the UE 40 side, there similarly exists a corresponding RLC entity 76. These two corresponding RLC entities 76 for the same RB 28, 48 are termed "RLC peer entities". Under acknowledged mode (AM) transfers, the RLC layer 72 can provide upper layers (such as the PDCP layer 70 or the RRC layer 80) with a confirmation that RLC PDUs have been successfully transmitted and received between the RLC peer entities 76 on the UTRAN 20*u* and the UE 40. The MAC layer 74 provides scheduling and multiplexing of RLC PDUs onto the transport channel, interfacing with the physical layer 60.

Please refer to FIG. 3 with reference to FIG. 1 and FIG. 2. FIG. 3 is a state diagram of the RRC layer 80. The RRC layer 80 has two primary states: an idle mode 81 and a UTRA RRC Connected Mode 86. While in idle mode, the RRC layer 80 has no lines of communication open with its peer RRC layer 80. That is, there are no available SRBs 28, 48 that enable communications between peer entity RRC layers 80, except for RB0, which is a common channel available to all UEs 40 in the UTRAN 20*u*. Utilizing the UE 40 as an example platform, once the RRC layer 80 of the UE 40 establishes a connection (i.e., SRBs 28, 48 from one to four) with its peer RRC layer 80 on the UTRAN 20*u*, the RRC layer 80 of the UE 40 switches into the UTRA RRC Connected Mode 86. This connection is typically initiated along RB0, which is a shared channel. Internally, the UTRA RRC Connected Mode 86 has four unique states: CELL_

DCH 82, CELL_FACH 83, CELL_PCH 84 and URA_PCH 85. The CELL_DCH state 82 is characterized in that a dedicated channel is allocated to the UE 40 for uplink (UE 40 to UTRAN 20*u*) and downlink (UTRAN 20*u* to UE 40) communications. The CELL_FACH state 83 is characterized in that no dedicated channel is allocated to the UE 40, but instead the UE 40 is assigned a default common or shared transport channel for uplink. The CELL_PCH state 84 is characterized in that no dedicated physical channel is allocated to the UE 40, no uplink activity is possible for the UE 40, and the position of the UE 40 is known by the UTRAN 20*u* on a cell level (i.e., a node B basis 24). The URA_PCH state 85 is characterized in that no dedicated physical channel is allocated to the UE 40, no uplink activity is possible for the UE 40, and the position of the UE 40 is known by the UTRAN 20*u* on a URA basis.

A number of reconfiguration procedures are available to the RRC layer 80 to setup and configure RBs 28, 48. These procedures involve the UTRAN 20*u* sending a specific message to the UE 40 along an RB 28, 48 in the C-plane 92, and the UE 40 responding in turn with a corresponding message, also along the C-plane 92. Typically, the message is sent along RB2. The messages include Radio Bearer Setup, Radio Bearer Reconfiguration, Radio Bearer Release, Transport Channel Reconfiguration and Physical Channel Reconfiguration, as indicated in the above-indicated 3GPP specification TS 25.331, subclause 8.2.2. For each of these reconfiguration messages, the UE 40 has a corresponding "Complete" or "Failure" response message indicating success or failure of the procedure on the UE 40 side, and which may provide the UTRAN 20*u* any necessary information for the UTRAN 20*u* to complete the procedure. The reconfiguration message and the response message may all carry optional information elements (IEs), which are fields of data that hold ancillary information. In addition to these reconfiguration procedures, there also exists a Cell Update procedure, which originates with a Cell Update message from the UE 40 and which is responded to by the UTRAN 20*u*. The Cell Update procedure is used by the UE 40 to indicate a change of cell location (i.e., Node B 24), of connection state 82, 83, 84, 85, and is also used to indicate radio link (RL) failures and RLC unrecoverable errors. An RL failure is a connection failure that occurs in the physical layer, i.e., in layer 160. An RLC unrecoverable error occurs in the RLC layer 72, and may have many causes.

For AM connections, when a sender RLC entity 76 detects one of the following situations, it shall senda RESET PDU to its peer RLC entity 76 to reset these two RLC peer entities 76:

1)"No_Discard after MaxDAT number of retransmissions" is configured and VT(DAT) equals the value MaxDAT (see subclause 9.7.3.4 of TS 25.322);

2)VT(MRW) equals the value MaxMRW;

3)A STATUS PDU including "erroneous Sequence Number" is received (see clause 10 of TS 25.322);

stop transmitting any AMD PDU or STATUS PDU;
increment VT(RST) by 1;
if VT(RST)=MaxRST:
the Sender may submit to the lower layer a RESET PDU;
perform the actions specified in subclause 11.4.4*a* of TS 25.322.
else (if VT(RST)<MaxRST):
submit a RESET PDU to the lower layer;
start the timer Timer_RST.

Please refer to subclause 11.4 of the above-indicated 3GPP specification TS 25.322 for more details. When the maximum number of attempts to send a RESET PDU is reached, the sender RLC entity 76 shall terminate the on-going RLC RESET procedure and indicate an unrecoverable error to the upper layer (RRC layer 80). Whenthe RRC layer 80 receives the indicated unrecoverable error from the AM RLC entity 76, the UE 40 shall perform a Cell Update procedure using the cause "RLC unrecoverable error", i.e. the UE 40 shall send a CELL UPDATE message with an IE "AM_RLC error indication (RB2, RB3 or RB4)" or "AM_RLC error indication (RB>4)" set to "TRUE" to indicate the RLC unrecoverable errorhasoccurred in control plane 92 or in the user plane 94. Please refer to TS 25.331, subclause 8.3.1 for more details of the Cell Update procedure, which is discussed briefly in the following.

For an RLC unrecoverable error in the user plane 94, after reception of a CELL UPDATE/URA UPDATE message from UE 40, the UTRAN20*u* should optionally include the IE "RLC re-establish indicator (RB5 and upwards)" in the CELL UPDATE CONFIRM message to request an RLC re-establishment procedure in the UE 40, in which case the corresponding RLC entities 76 should also be re-established in UTRAN 20*u*.

For an RLC unrecoverable error in the control plane 92, after reception of a CELL UPDATE/URA UPDATE message from UE 40, the UTRAN20*u* should optionally include the IE "RLC re-establish indicator (RB2, RB3 and RB4)" in the CELL UPDATE CONFIRM message to request an RLC re-establishment procedure in the UE 40, in which case the corresponding RLC entities 76 should also be re-established in UTRAN 20*u*, or initiate an RRC connection release procedure by transmitting an RRC CONNECTION RELEASE message on the downlink CCCH.

If an RL failure or an RLC unrecoverable errortakes place on a dedicated channel (i.e. the RRC layer 80 is in the CELL_DCH state 82), before sending a CELL UPDATE message, the UE 40 shouldperform radio access bearer (RAB) release steps, and then select a suitable cell 24. The RAB release steps release the RABs for which the associated timer T314/T315 is equal to zero.A RAB can comprise one or more RBs, but normally there is a one-to-one relationship between RABs and RBs. While performing the RLC re-establishment procedure, if eithertimer T314 or T315 expires, the UE 40 should also release the RABs associated with the expired timer. Instructions as given by subclause 8.3.1.2 of TS 25.331, as relates to the above, are provided below. All subclauses indicated in the steps below are from TS 25.331.

When initiating the URA update or cell update procedure, the UE shall:

1>stop timer T305;

1>if the UE isin CELL_DCH state:

2>Perform RAB release steps;

1>set the variables PROTOCOL_ERROR_INDICATOR, FAILURE_INDICATOR, UNSUPPORTED_CONFIGURATION and INVALID_CONFIGURATION to FALSE;

1>set the variable CELL_UPDATE_STARTED to TRUE;

1>if the UE is not already in CELL_FACH state:

2>move to CELL_FACH state;

2>select PRACH according to subclause 8.5.17;

2>select Secondary CCPCH according to subclause 8.5.19;

2>use the transport format set given in system information as specified in subclause 8.6.5.1.

1>if the UE performs cell re-selection:

2>clear the variable C_RNTI; and

2>stop using that C_RNTI just cleared from the variable C_RNTI in MAC.

1>set CFN in relation to SFN of current cell according to subclause 8.5.15;

1>in case of a cell update procedure:

2>set the contents of the CELL UPDATE message according to subclause 8.3.1.3;

2>submit the CELL UPDATE message for transmission on the uplink CCCH.

1>in case of a URA update procedure:

2>set the contents of the URA UPDATE message according to subclause 8.3.1.3;

2>submit the URA UPDATE message for transmission on the uplink CCCH.

1>set counter V302 to 1;

1>start timer T302 when the MAC layer indicates success or failure in transmitting the message.

The prior art RAB release steps are given below. Again, subclauses mentioned in the steps below are from TS 25.331.

For the RAB release steps, the UE shall:

2>in the variable RB_TIMER_INDICATOR, set the IE "T314 expired" and the IE "T315 expired" to FALSE;

2>if the stored values of the timer T314 and timer T315 are both equal to zero; or 2>if the stored value of the timer T314 is equal to zero and there are no radio bearers associated with any radio access bearers for which in the variable ESTABLISHED_RABS the value of the IE "Re-establishment timer" is set to "useT315":

3>release all its radio resources;

3>indicate release (abort) of the established signalling connections (as stored in the variable ESTABLISHED_SIGNALLING_CONNECTIONS) and established radio access bearers (as stored in the variable ESTABLISHED_RABS) to upper layers;

3>clear the variable ESTABLISHED_SIGNALLING_CONNECTIONS;

3>clear the variable ESTABLISHED_RABS;

3>enter idle mode;

3>perform other actions when entering idle mode from connected mode as specified in subclause 8.5.2;

3>and the procedure ends.

2>if the stored value of the timer T314 is equal to zero:

3>release all radio bearers, associated with any radio access bearers for which in the variable ESTABLISHED_RABS the value of the IE "Re-establishment timer" is set to "useT314";

3>in the variable RB_TIMER_INDICATOR set the IE "T314 expired" to TRUE.

2>if the stored value of the timer T315 is equal to zero:

3>release all radio bearers associated with any radio access bearers for which in the variable ESTABLISHED_RABS the value of the IE "Re-establishment timer" is set to "useT315";

3>in the variable RB_TIMER_INDICATOR set the IE "T315 expired" to TRUE.

2>if the stored value of the timer T314 is greater than zero:

3>if there are radio bearers associated with any radio access bearers for which in the variable ESTABLISHED_RABS the value of the IE "Re-establishment timer" is set to "useT314":

4>start timer T314.

3>if there are no radio bearers associated with any radio access bearers for which in the variable ESTABLISHED_RABS the value of the IE "Re-establishment timer" is set to "useT314" or "useT315":

4>start timer T314.

2>if the stored value of the timer T315 is greater than zero:

3>if there are radio bearers associated with any radio access bearers for which in the variable ESTABLISHED_RABS the value of the IE "Re-establishment timer" is set to "useT315":

4>start timer T315.

2>for the released radio bearer(s):

3>delete the information about the radio bearer from the variable ESTABLISHED_RABS;

3>when all radio bearers belonging to the same radio access bearer have been released:

4>indicate local end release of the radio access bearer to upper layers using the CN domain identity together with the RAB identity stored in the variable ESTABLISHED_RABS;

4>delete all information about the radio access bearer from the variable ESTABLISHED_RABS.

2>select a suitable UTRA cell according to [4];

2>set the variable ORDERED_RECONFIGURATION to FALSE.

For example, if the stored value of the timer T314 is equal to zero and the stored value of the timer T315 is greater than zero, then the UE 40 shouldrelease locally all radio bearers 48 which are associated with any radio access bearers for which in the variable ESTABLISHED_RABS the value of the IE "Re-establishment timer" is set to "useT314", andstart timer T315. If timer T315 expires, the UE 40 should also release locally all radio bearers 48 which are associated with any radio access bearers for which in the variable ESTABLISHED_RABS the value of the IE "Re-establishment timer" is set to "use T315", and enter idle mode 81.

The prior art UE40, as detailed in TS 25.331, subclause 8.3.1.2, treats the cases of both RL failure and RLC unrecoverable error while the RRC 80 is in theCELL_DCH state 82 inthe same manner. That is, both error conditions while in the CELL_DCH state 82 will lead to the execution of the RAB release steps. However, RL failures and RLC unrecoverable errors have some essential differences.For example, an RLC unrecoverable error can be potentially "fixed" by returning to initial conditions by way of an RLC re-establishment procedure.An RL failure cannot, however, be "fixed" by a re-establishment procedure, as it is fundamentally a physical problem with the radio connection. Therefore, the usage of the timers T314 and T315 for RLC unrecoverable errors(as performed by the RAB release steps) on a dedicated channel is unwarranted, and may lead to some normally-functioning RABs (i.e. services or applications) being released before the RLC is re-established if the timers T314/T315 are shorter than the time required to perform the RLC re-establishment procedure.

By way of example, consider the situation in which the UE 40 is in the CELL_DCH state 82, and has U-plane 94 RABs 6 to 10 that comprise RBs 486 to 10 with a one-to-one mapping. Furtherassume that the timer T314 is set to zero seconds, and that the timer T315 is set to 10 seconds, and that all RABs except RABs 6 and 7 are associated with T314. If an RLC unrecoverable error occurs only on RB 6, the UE 40 sends a CELL UPDATE message with the IE "AM_RLC error indication (RB>4)" set to "TRUE" to the UTRAN 20*u*. The UTRAN 20*u* responds with a CELL UPDATE CONFIRM message that includes the IE "RLC re-establish indicator (RB5 and upwards)" to request a RLC re-establishment for all RABs 6 to 10 in the UE 40. The RABs 8,9 and 10 (i.e. RB 8,9 and 10) that are running correctly will be released before re-establishment is completed, since the timer T314 (at zero seconds) is shorter than the time required to perform the RLC re-establishment procedure. The malfunctioning RB 6 (i.e. RAB 6)is restored to operational order after performing the RLC re-establishment procedure, but the correctly functioning RBs 8,9 and 10 (i.e. RABs 8,9,10) are released before performing the RLC re-establishment procedure. The unnecessary release of correctly functioning RABs (i.e. services or applications) by the RAB release steps leads to areduction in the radio utilization capacity, and increases the services drop rate, which is a great inconvenience to the user of the UE 40.

Finally, according to subclause 8.3.1.6 of TS 25.331, the UE 40 shall handle both the IE "RLC re-establish indicator (RB2, RB3 and RB4)" and IE "RLC re-establish indicator (RB5 and upwards)" if received in the CELL UPDATE CONFIRM message. However, according to subclause 8.3.1.5 of TS 25.331, the UTRAN 20*u* may only include the IE "RLC re-establish indicator (RB5 and upwards)" in the CELL UP-DATE CONFIRM message. Hence, the IE "RLC re-establish indicator (RB2, RB3 and RB4)" is actually a useless procedural indicator, as it is impossible to be included in the CELL UPDATE CONFIRM message by the UTRAN 20*u*.

SUMMARY OF INVENTION

It is therefore a primary objective of this invention to provide an improved method for handling an unrecoverable error on a dedicated channel so as to avoid the above-indicated problems.

In a preferred embodiment, the present invention discloses a method, and associated wireless device, for handling an unrecoverable error on a dedicated channel. Briefly, if it is determined that the wireless device is in the CELL_DCH state and that a layer one radio link failure has occurred, improved radio access bearer (RAB) release steps are performed to release radio bearers. However, if it is determined that the wireless device is in the CELL_DCH state and that layer one radio link failure has not occurred, the RAB release steps are not performed.

Additionally, the present invention method explicitly permits the UTRAN to transmit a CELL UPDATE CONFIRM message to the UE that contains the information element (IE) "RLC re-establish indicator (RB2, RB3 and RB4)".

It is an advantage of the present invention that by performing the RAB release steps only when a layer one radio link failure is detected on the dedicated channel, unnecessary releasing of RABs is avoided, and thus theunnecessary dropping of services if avoided. By avoiding use of the timer T314 and T315 for RLC unrecoverable errors, the UE is ensured to be provided enough time to re-establish the RLC connections, and thus restore services with dropping the RABs.

It is yet another advantage of the present invention that the UTRAN may explicitly include the IE "RLC re-establish indicator (RB2, RB3 and RB4)" in the CELL UPDATE CONFIRM message sent to the UE, and hence give relevance to the IE "RLC re-establish indicator (RB2, RB3 and RB4)" initially transmitted by the UE to the UTRAN.

These and other objectives of the present invention will no doubt become obvious to those of ordinary skill in the art after reading the following detailed description of the preferred embodiment, which is illustrated in the various figures and drawings.

DETAILED DESCRIPTION

In the following description, user equipment (UE) is a wireless communications device, and may be a mobile telephone, a handheld transceiver, a personal data assistant (PDA), a computer, or any other device that requires a wireless exchange of data. It is assumed that this wireless exchange of data conforms to 3GPP-specified protocols.

Figure 1:
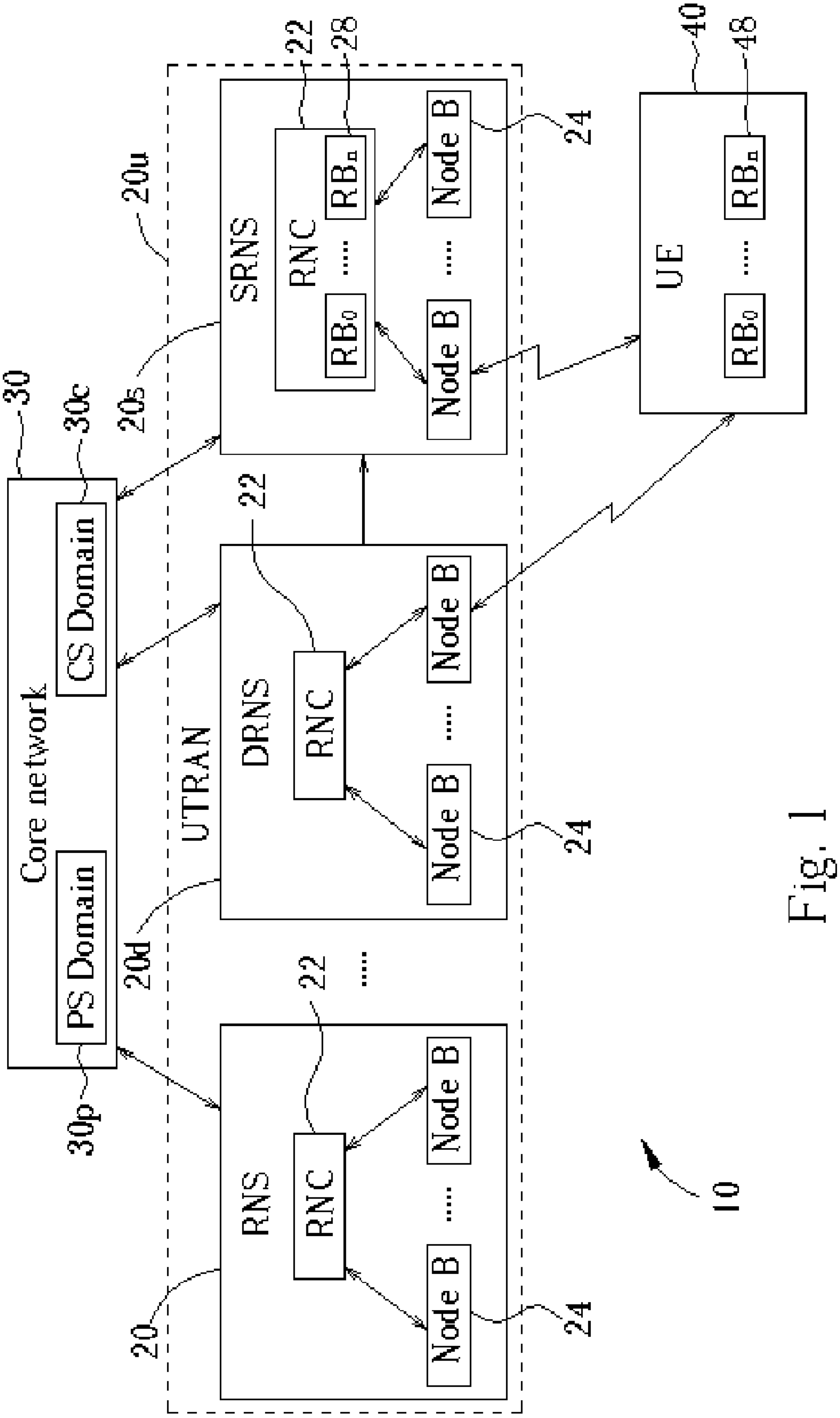
FIG. 1 is a simple block diagram of a wireless communications system.
Figure 2:
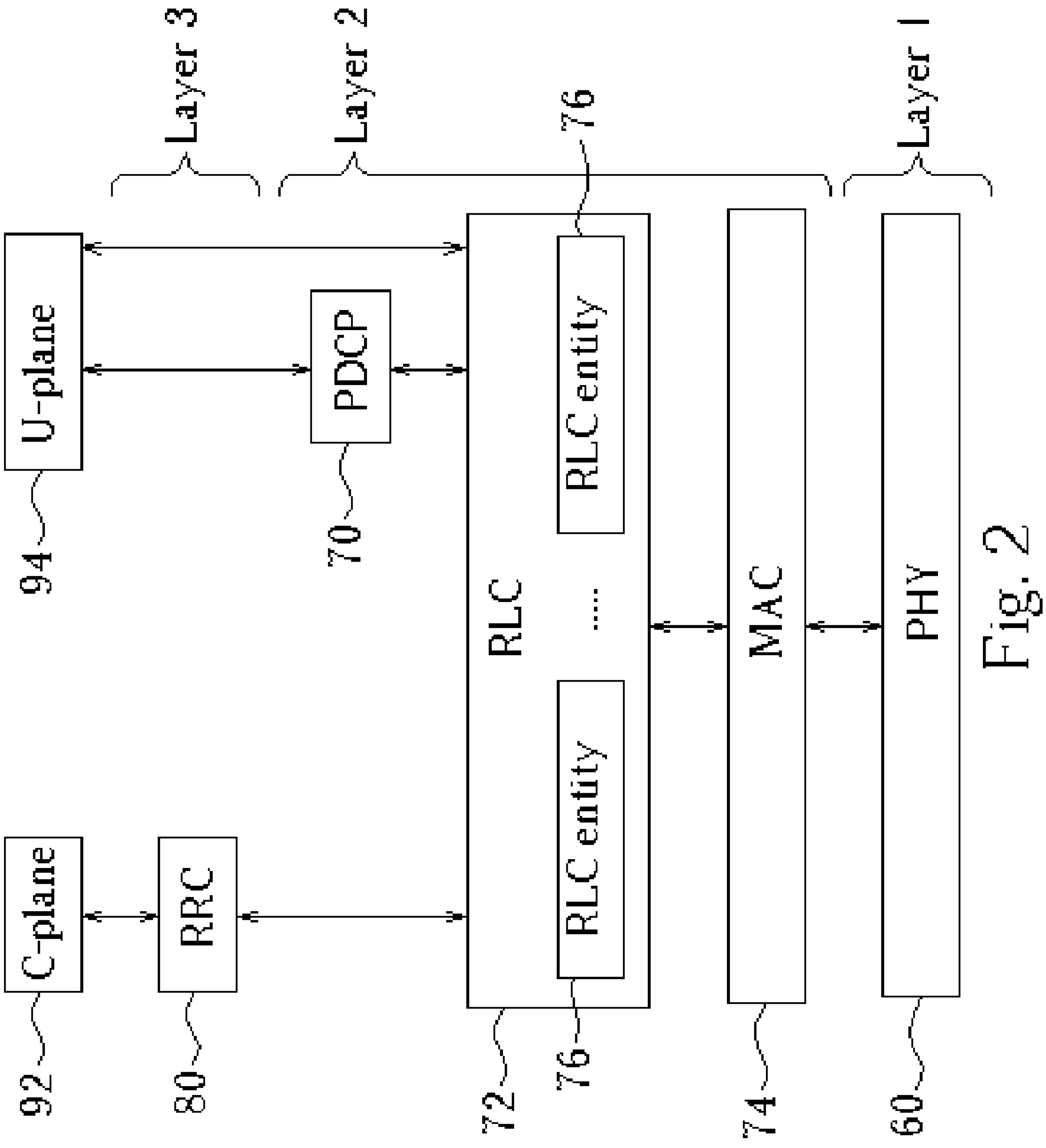
FIG. 2 is a simple block diagram of a UMTS radio interface protocol architecture.
Figure 3:
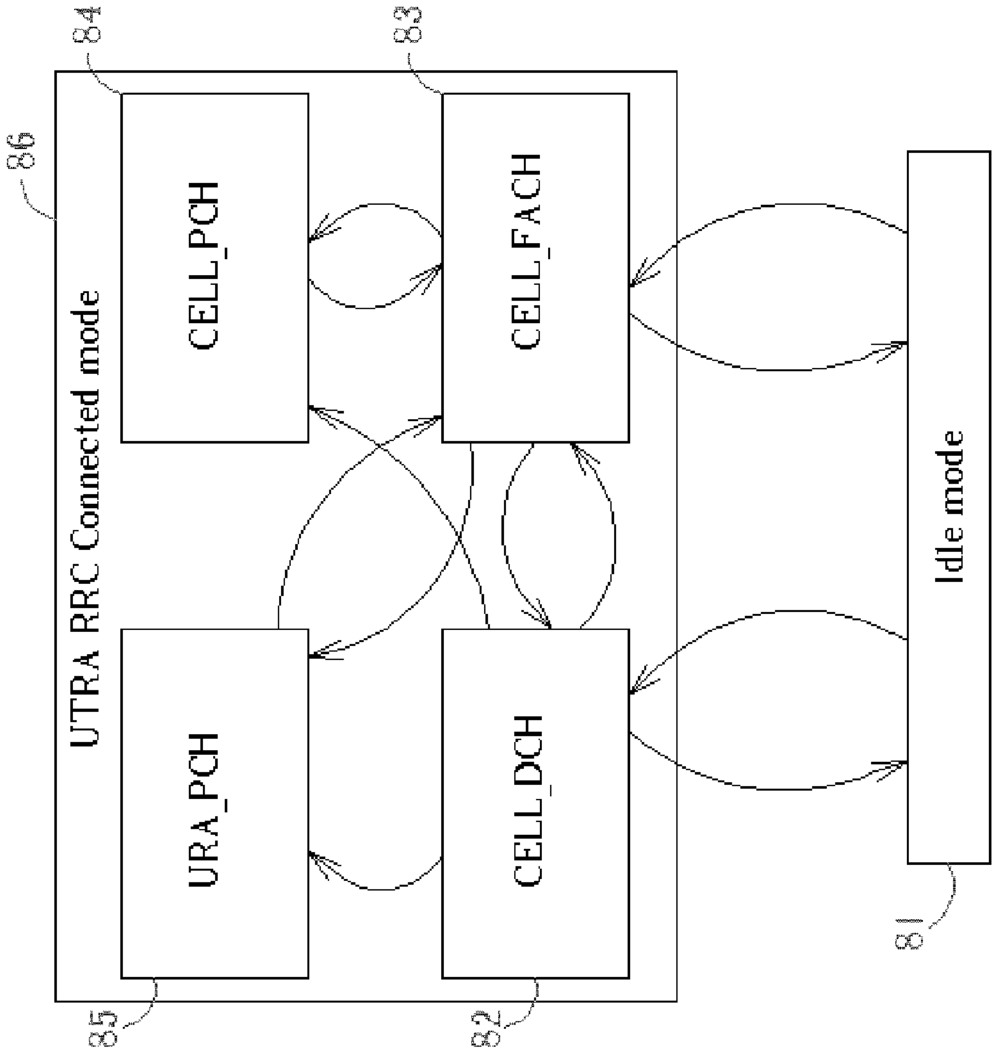
FIG. 3 is a state diagram of a Radio Resource Control (RRC) RRC layer shown in FIG. 2.
Figure 4:
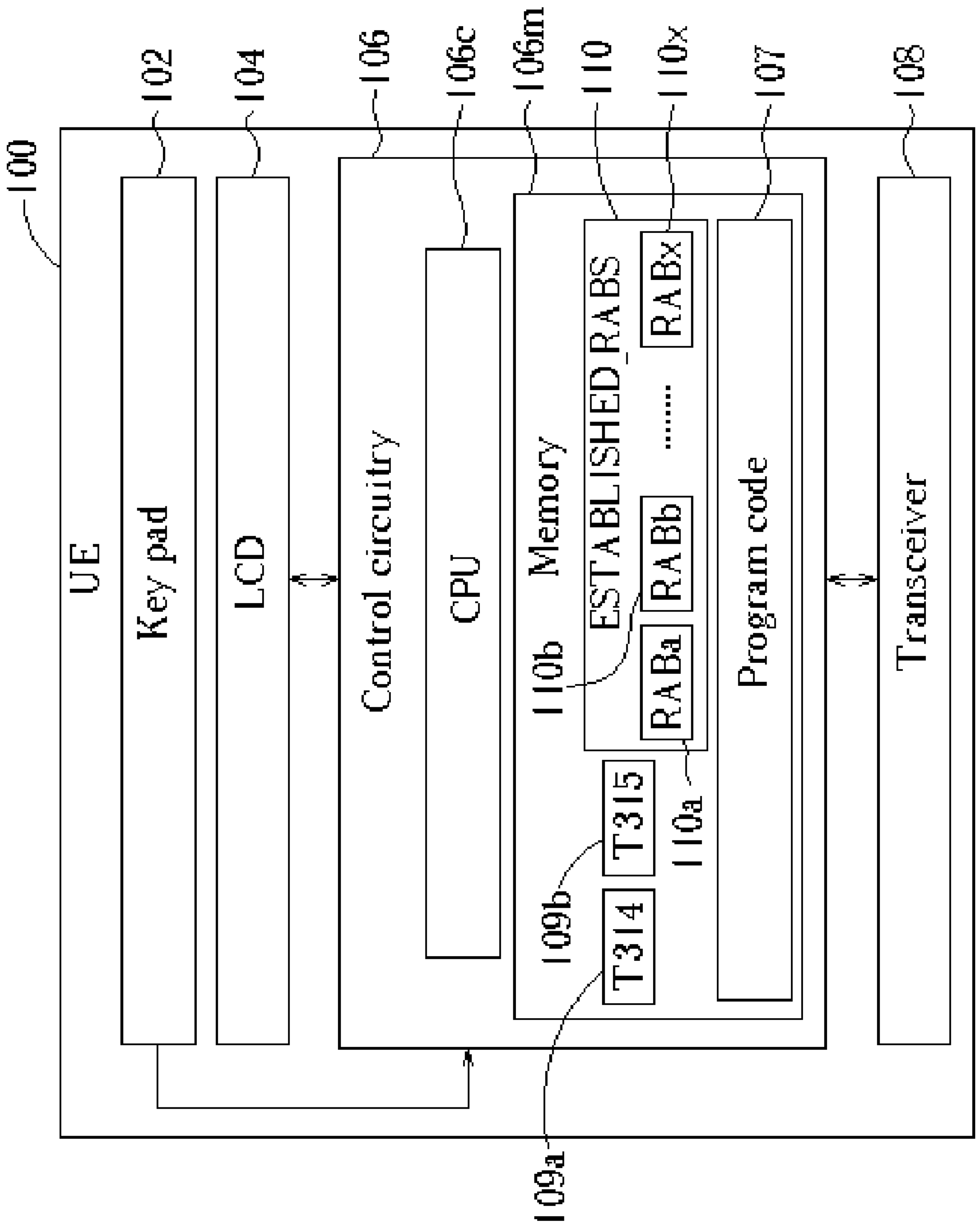
FIG. 4 is a block diagram of a wireless device according to the present invention.

Please refer to FIG. 4. FIG. 4 is a block diagram of a user equipment (UE) 100 according to the present invention. In most respects, the present invention UE 100 is identical to a UE of the prior art. The UE 100 includes devices for accepting input and providing output, such as a keypad 102 and a liquid crystal display (LCD) 104, respectively. A transceiver 108 is capable of receiving wireless signals and providing corresponding data to a control circuit 106, and can also wirelessly transmit data received from the control circuit 106. The transceiver 108 is thus part of the 3GPP layer 1 stack 60 of the present invention communications protocol. The control circuitry 106 is responsible for controlling the operations of the UE 100, and is used to implement the layer 2 and layer 3 stacks of the 3GPP communications protocol; in particular, for implementing the RRC layer 80, with suitable modifications to accommodate the present invention improvements. To this end, the control circuitry 106 includes a central processing unit (CPU) 106*c* in electrical communication with memory 106*m*, an arrangement familiar to those in the art of wireless communication devices. The memory 106*m* holds program code 107 that is used to implement the layer 2 and layer 3 stacks of the present invention communications protocol. With respect to a UE of the prior art, the present invention UE 100 has modifications to the program code 107 to implement the present invention method, providing modifications to the program code 107 that relate to the RRC layer 80 so as to implement the present invention improvements. These modifications should be well within the means of one reasonably skilled in the art after reading the following detailed description of the preferred embodiment.

When an RLC unrecoverable error occurs (as detected by the RLC layer 72) on a dedicated channel (i.e. the RRC layer 80 is in the CELL_DCH state 82), the UE 100 does not check to see if timer T314 109*a* or timer T315 109*b* is zero to release the associated RABs.That is, the RAB release steps are not called in response to an RLC unrecoverable error while the UE 100 is in the CELL_DCH state 82. Hence, the timers T314 109*a* and T315 109*b* are only used for RL failure (as detected by the layer 1 interface 60 of the transceiver 108), and are not used for RLC unrecoverable errors (as detected by the RLC layer 72) on a dedicated channel.

When a cell update procedure is to be performed, the present invention further alters the conditions under which the RAB release steps are performed. The following details the improved steps of the present invention method (as implemented by program code 107) that determine how the UE 100 performs a cell update procedure or URA update procedure.

Figure 5:
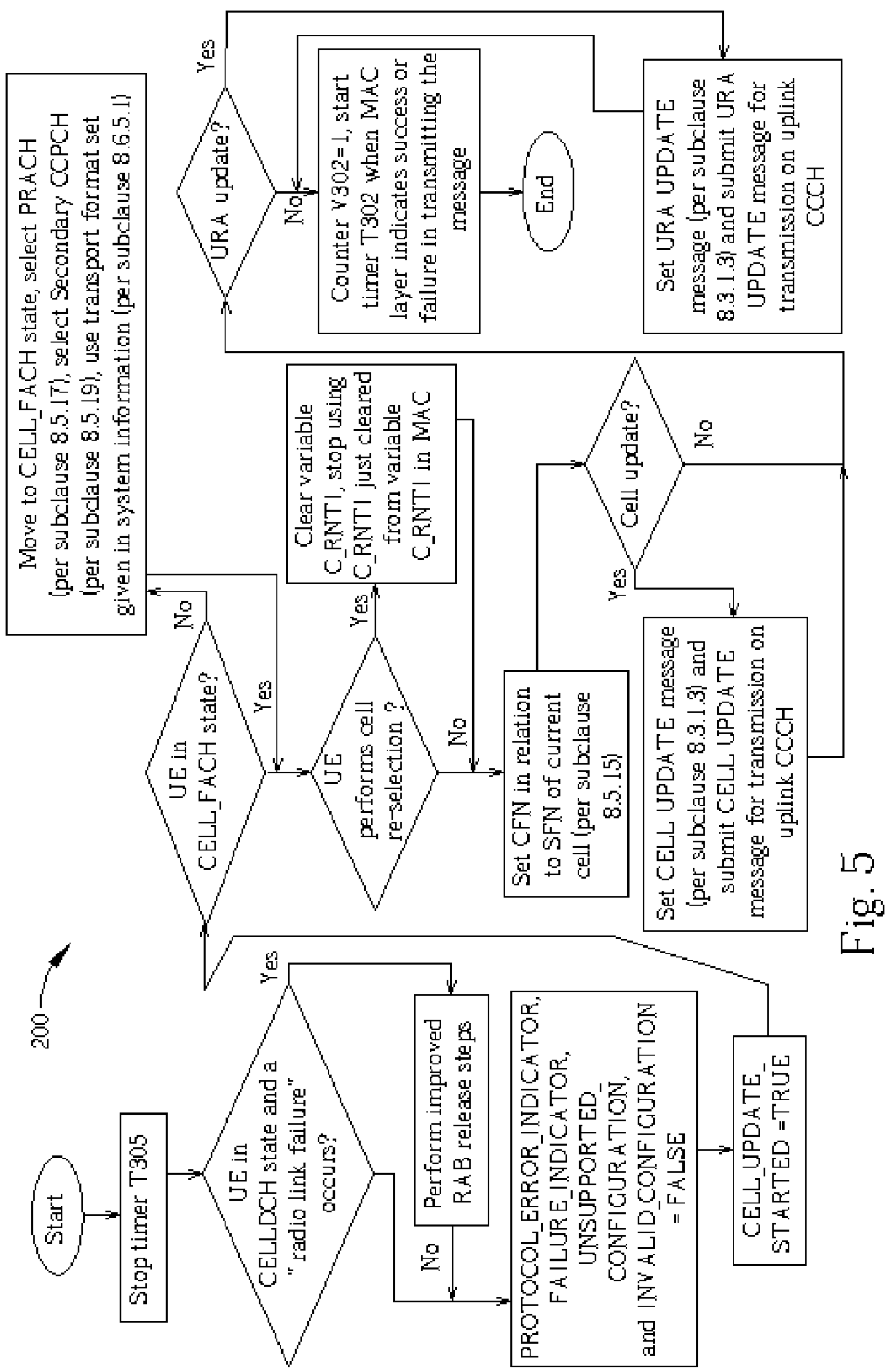
FIG. 5 is a flowchart for determining how the UE of FIG. 4 performs a cell or URA update procedure according to the present invention.

Referring to the flowchart 200 of FIG. 5, when initiating the URA update or cell update procedure, the UE shall:

1>stop timer T305;

1>if the UE isin CELL_DCH state; and

1>if the cause that triggers this procedure is due to "radio link failure":

2>perform improved RAB release steps;

1>set the variables PROTOCOL_ERROR_INDICATOR, FAILURE_INDICATOR, UNSUPPORTED_CONFIGURATION and INVALID_CONFIGURATION to FALSE;

1>set the variable CELL_UPDATE_STARTED to TRUE;

1>if the UE is not already in CELL_FACH state:

2>move to CELL_FACH state;

2>select PRACH according to subclause 8.5.17;

2>select Secondary CCPCH according to subclause 8.5.19;

2>use the transport format set given in system information as specified in subclause 8.6.5.1.

1>if the UE performs cell re-selection:

2>clear the variable C_RNTI; and

2>stop using that C_RNTI just cleared from the variable C_RNTI in MAC.

1>set CFN in relation to SFN of current cell according to subclause 8.5.15;

1>in case of a cell update procedure:

2>set the contents of the CELL UPDATE message according to subclause 8.3.1.3;

2>submit the CELL UPDATE message for transmission on the uplink CCCH.

1>in case of a URA update procedure:

2>set the contents of the URA UPDATE message according to subclause 8.3.1.3;

2>submit the URA UPDATE message for transmission on the uplink CCCH.

1>set counter V302 to 1;

1>start timer T302 when the MAC layer indicates success or failure in transmitting the message.

Subclauses mentioned in the steps above are identical to those in the prior art, and refer to TS 25.331. Hence, for the sake of brevity, the details of those steps contained within the above-mentioned subclauses is omitted. Note that the present invention cell update/URA update procedural steps now ensure that the RAB release steps are performed only if (1) the UE 100 is in the CELL_DCH state 82; and (2) the cause that triggers the cell update/URA update procedure is due to "radio link failure". Hence, with the present invention procedure, as implemented by the program code 107, only a "radio link failure" type error can cause the execution of the RAB release steps. In particular, then, an "RLC unrecoverable error" type cause for performing the present invention cell update/URA up-date procedure cannot and does not lead to the execution of the RAB release steps.

Figure 6:
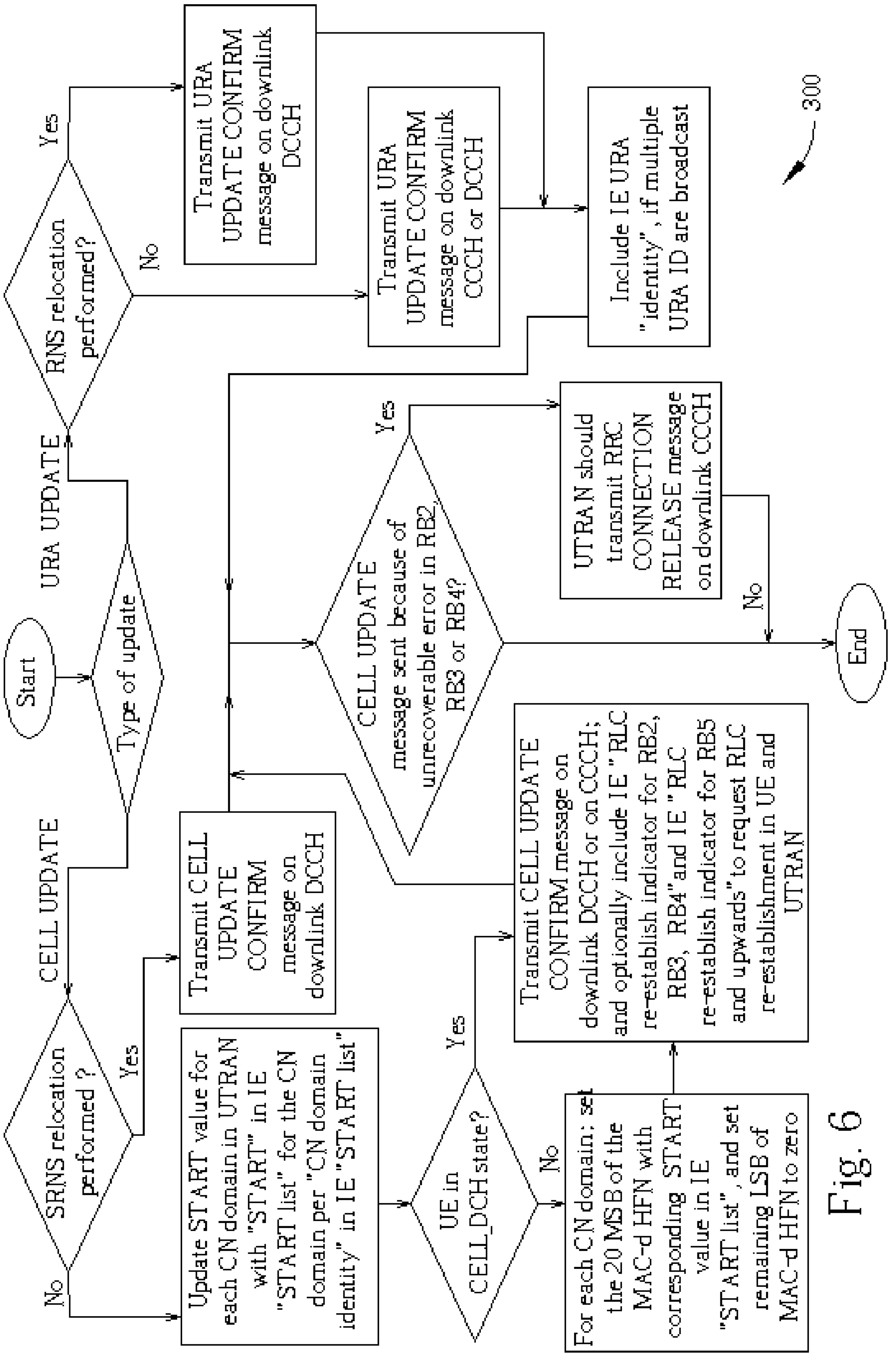
FIG. 6 is a flowchart of a present invention procedure that the UTRAN of FIG. 1 executes after receiving a CELL UP-DATE or URA UPDATE message.

To ensure that the IE "RLC re-establish indicator (RB2, RB3 and RB4)" is functionally relevant and useful procedural indicator, the present invention augments the procedure steps taken by the UTRAN 20*u* when the UTRAN 20*u* receives a CELL UPDATE/URA UPDATE message. The steps are detailed below and illustrated in the flowchart 300 of FIG. 6, and correspond to the prior art steps detailed in TS 25.331 subclause 8.3.1.5.

When the UTRAN receives a CELL UPDATE/URA UPDATE message, the UTRAN should:

1>in case the procedure was triggered by reception of a CELL UPDATE:

2>if SRNS relocation was performed:

3>transmit a CELL UPDATE CONFIRM message on the downlink DCCH.

2>otherwise:

3>update the START value for each CN domain as maintained in UTRAN with "START" in the IE "START list" for the CN domain as indicated by "CN domain identity" in the IE "START list";

3>if this procedure was triggered while the UE was not in CELL_DCH state, then for each CN domain as indicated by "CN domain identity" in the IE "START list":

4>set the 20 MSB of the MAC-d HFN with the corresponding START value in the IE "START list";

4>set the remaining LSB of the MAC-d HFN to zero.

3>transmit a CELL UPDATE CONFIRM message on the downlink DCCH or optionally on the CCCH but only if ciphering is not required; and 3>optionally include the IE "RLC re-establish indicator (RB2, RB3 and RB4)" and the IE "RLC re-establish indicator (RB5 and upwards)" to request a RLC re-establishment in the UE, in which case the corresponding RLC entities should also be re-established in UTRAN; or 1>in case the procedure was triggered by reception of a URA UPDATE:

2>if SRNS relocation was performed:

3>transmit a URA UPDATE CONFIRM message on the downlink DCCH.

2>otherwise:

3>transmit a URA UPDATE CONFIRM message on the downlink CCCH or DCCH.

2>include the IE "URA identity" in the URA UPDATE CONFIRM message in a cell where multiple URA identifiers are broadcast; or 1>initiate an RRC connection release procedure by transmitting an RRC CONNECTION RELEASE message on the downlink CCCH. In particular UTRAN should:

2>if the CELL UPDATE message was sent because of an unrecoverable error in RB2, RB3 or RB4:

3>initiate an RRC connection release procedure by transmitting an RRC CONNECTION RELEASE message on the downlink CCCH.

The UTRAN may transmit several CELL UPDATE CONFIRM/URA UPDATE CONFIRM messages to increase the probability of proper reception of the message by the UE. In such a case, the RRC SN for these repeated messages should be the same.

With regard to the steps above, it should be noted that the present invention steps enable the UTRAN to optionally include the IE "RLC re-establish indicator (RB2, RB3 and RB4)" and/or the IE "RLC re-establish indicator (RB5 and upwards)" to request a RLC re-establishment in the UE. In contrast, the prior art permitted only the IE "RLC re-establish indicator (RB5 and upwards)".

In contrast to the prior art, the present invention prevents the RAB release steps from being performed when an RLC unrecoverable error is detected while the UE is in the CELL_DCH state. Additionally, UTRAN may explicitly include the IE "RLC re-establish indicator (RB2, RB3 and RB4)" in the CELL UPDATE CONFIRM message sent to the UE, and hence give relevance to the IE "RLC re-establish indicator (RB2, RB3 and RB4)" initially transmitted by the UE to the UTRAN in the CELL UPDATE message.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for handling an unrecoverable error on a dedicated channel for a wireless device, the method comprising:

determining if the wireless device is in a CELL_DCH state;

determining if a layer one radio link failure has occurred;

in response to determining that the wireless device is in the CELL_DCH state and that radio link failure has occurred, performing radio access bearer (RAB) release steps to release radio bearers;

determining that an RLC unrecoverable error has occurred; and in response to determining that the wireless device is in the CELL_DCH state and that the RLC unrecoverable error has occurred, not performing the RAB release steps to release radio bearers.

2. The method of claim 1 further comprising the wireless device initiating a Cell Update procedure.

3. The method of claim 2 further comprising:

in response to the wireless device initiating the Cell Update procedure, a Universal Terrestrial Radio Access Network (UTRAN) receiving a CELL UPDATE message from the wireless device;

in response to receiving the CELL UPDATE message, the UTRAN composing a CELL UPDATE CONFIRM message comprising an information element (IE) "RLC re-establish indicator (RB2, RB3 and RB4)"; and the UTRAN transmitting the CELL UPDATE CONFIRM message to the wireless device.

4. A wireless system comprising a first wireless device, the first wireless device comprising a first central processing unit (CPU) electrically connected to a first memory, the first memory containing first program code executable by the first CPU, the first program code causing the first CPU to perform the following steps:

determining if the first wireless device is in a CELL_DCH state;

determining if a layer one radio link failure has occurred;

in response to determining that the first wireless device is in the CELL_DCH state and that radio link failure has occurred, performing radio access bearer (RAB) release steps to release radio bearers;

determining that an RLC unrecoverable error has occurred; and in response to determining that the first wireless device is in the CELL_DCH state and that the RLC unrecoverable error has occurred, not performing the RAB release steps to release radio bearers.

5. The wireless system of claim 4 wherein the first program code further causes the first wireless device to initiate a Cell Update procedure.

6. The wireless system of claim 5 further comprising a second wireless device, the second wireless device comprising a second CPU electrically connected to a second memory, the second memory containing second program code executable by the second CPU, the second program code causing the second CPU to perform the following steps:

receiving a CELL UPDATE message from the first wireless device;

in response to receiving the CELL UPDATE message, composing a CELL UPDATE

CONFIRM message comprising an information element (IB) "RLC re-establish indicator (RB2, RB3 and RB4)"; and transmitting the CELL UPDATE CONFIRM message to the first wireless device.

* * * * *

UNITED STATES PATENT AND TRADEMARK OFFICE

CERTIFICATE OF CORRECTION

PATENT NO. : 7,209,747 B2
APPLICATION NO. : 10/605121
DATED : April 24, 2007
INVENTOR(S) : Rex Huan-Yueh Chen It is certified that error appears in the above-identified patent and that said Letters Patent is hereby corrected as shown below:

On the title page item [73] Assignee, please change "Asustek Computer Inc., Taipei (TW)" to --INNOVATIVE SONIC LIMITED, Road Town, Tortola (BVI)--.

Signed and Sealed this

Tenth Day of June, 2008

JON W. DUDAS
*Director of the United States Patent and Trademark Office*